July 14, 1970 G. E. KEEFER 3,520,668

HOLLOW GLASS ARTICLE BY MODULE IMMERSION TECHNIQUE

Filed Oct. 23, 1965 4 Sheets-Sheet 1

INVENTOR.
GEORGE E. KEEFER
BY W. A. Schaich
Charles S. Lynch
ATTORNEYS

INVENTOR.
GEORGE E. KEEFER
BY W. A. Schaich &
Charles S. Lynch
ATTORNEYS

July 14, 1970    G. E. KEEFER    3,520,668
HOLLOW GLASS ARTICLE BY MODULE IMMERSION TECHNIQUE
Filed Oct. 23, 1965    4 Sheets-Sheet 3

INVENTOR.
GEORGE E. KEEFER
BY W.A. Schaich &
Charles S. Lynch
ATTORNEYS

July 14, 1970        G. E. KEEFER        3,520,668

HOLLOW GLASS ARTICLE BY MODULE IMMERSION TECHNIQUE

Filed Oct. 23, 1965        4 Sheets-Sheet 4

INVENTOR.
GEORGE E. KEEFER
BY W. A. Schaich &
Charles S. Lynch
ATTORNEYS

United States Patent Office 3,520,668
Patented July 14, 1970

3,520,668
HOLLOW GLASS ARTICLE BY MODULE
IMMERSION TECHNIQUE
George E. Keefer, Toledo, Ohio, assignor to Owens-Illinois, Inc., a corporation of Ohio
Filed Oct. 23, 1965, Ser. No. 503,831
The portion of the term of the patent subsequent to July 1, 1986, has been disclaimed
Int. Cl. C03c 19/00, 29/00
U.S. Cl. 65—23     11 Claims

ABSTRACT OF THE DISCLOSURE

Hollow glass articles, such as telescope mirror blanks, having at least one opening and an internal cavity communicating with the atmosphere through the opening, the cross-sectional areas of the opening being less than that of the cavity are made by filling an open top mold with a pool of molten glass and disposing in the pool a normally rigid shaped core which ultimately forms the desired internal cavity. The bulk of the core is formed of the material that is molten at the fiber softening point temperature of the molten glass, the core being initially at a temperature lower than the melting point. The core is supported in the molten glass by means having a cross-sectional area less than that of the cross-sectional area of the cavity and whereby the molten glass flows around, under and over the core and surrounds the supporting means disposed in the molten glass. Subsequently, the core cools the molten glass in contact with the core whereby the viscosity of the molten glass is increased until the mass becomes self supporting. The core is then permitted to melt and is removed in the molten condition from the self supporting glass article. Also disclosed is a method wherein the vitreous material is then thermally crystallized to form a crystallized glass ceramic hollow article. Apparatus for receiving and shaping the molten mass are also described including an open top mold having a plurality of shaped cores, the cores being formed of a material which melts at a temperature below the high temperature to which the glass is subjected and the cores being supported on one of the surfaces of the mold in a predetermined arrangement.

---

This invention relates to a telescope mirror blank and telescope mirror made therefrom, and, more particularly, to a process for making a one-piece, lightweight, low-expansion telescope mirror blank. This invention also relates to apparatus suitable for use in making vitreous and ceramic lightweight objects having a plurality of cavities therein, such as telescope mirror blanks.

Telescope mirror blanks of large diameters and thicknesses present special and difficult problems in the casting thereof and, after the reflecting surface has been carefully ground, polished, figured, and coated, in the subsequent handling and mounting of these mirrors in the telescopes. Due to the enormous weight of the larger mirrors, complex mounting means must be utilized for supporting the mirror in the telescope, care being taken to assure that the mirror is always in strain-free condition, irrespective of its position as the telescope is moved to observe different areas of the sky.

Since the condition and configuration of the reflecting surface of the finished mirror determines the accuracy of the reflected image, and since the mirror must be of sufficient rigidity so as to prevent even the slightest movement or distortion of the reflecting mirror surface, the thickness of the mirror must be substantial in order to insure such rigidity. Attempts have been made in the past to lighten the overall weight of such telescope mirrors by forming a mirror blank of a minimum thickness and then subsequently bonding the under surface of the mirror blank to glass members of the same composition, which members, as a whole, impart a certain rigidity to the ultimate reflecting mirror.

One example of this is the use of an "egg-crate" construction wherein a plurality of elongated glass strips having spaced slotted portions along one longitudinally extending edge are interconnected with a plurality of similar glass strips extending at right angles thereto, the connection being at the respective slotted portions so that the final structure is of the same thickness or height as the individual strip, just as in the case of the interconnected cardboard members used with an egg crate to separate the individual eggs.

However, due to the overall size of the glass strips and the thickness of the mirror blank, considerable problems occur when the glass strips are subjected to temperatures sufficient to fuse them together along adjoining portions and also fuse the upper surface of the interlocked "egg-crate" structure to the bottom surface of the mirror blank. A glass back-up plate of sufficient thickness to impart rigidity to the mirror must also be fused to the other surface of the "egg-crate" structure. Since the casting of large mirrors is a very delicate operation, and the temperature to which the glass is subjected as it is being cooled has to be very carefully controlled, it will be apparent that serious problems occur as soon as an attempt is made to fuse to the "egg-crate" glass structure the bottom surface of the glass mirror blank and to the back-up plate. To do this successfully is a tedious, time-consuming operation which adds considerably to the cost of the final product.

In making transparent, glass-ceramic telescope mirror blanks of substantial thickness and diameter from thermally crystallizable base glass compositions, extreme care must be taken during the heat treatment steps to obtain uniform nucleation and uniform expansion properties throughout the blank. Difficulties arise because of the retention of heat by the blank and the nonuniform cooling of the cast blank which results. The center of the cast blank cools last, and nucleation starts and progresses more at the center than at the edges of the blank. Further, during the heat treatment the heat is withdrawn from the center of the blank last, permitting both nucleation and crystal growth to progress more in the center than at the exposed surfaces. Thus, many times, the center of an otherwise transparent glass-ceramic mirror blank is somewhat opaque because of the uncontrolled crystallization which occurs.

Accordingly, it is an object of this invention to provide a process for forming a one-piece, lightweight, reflecting, vitreous mirror blank for a telescope, which process avoids the disadvantages which exist in the prior art.

It is another object of this invention to provide a process for forming a one-piece, lightweight, low-expansion, vitreous telescope mirror blank wherein the surface of the blank can be ground, polished, figured and coated, whereby the resulting mirror, when mounted within a telescope, is of a rigidity sufficient to prevent any distortion of the reflecting surface.

Still another object of this invention is to provide a process for making a one-piece, lightweight, thermally crystallized glass-ceramic telescope mirror blank having a low coefficient of lineal thermal expansion wherein the mirror blank has a plurality of separate cavities disposed throughout its interior and communicating to the atmosphere through small openings in one surface of said blank, the volume of these cavities being such that the overall weight of said mirror blank is considerably reduced.

A further object of this invention is to provide a process for regulating the nucleation and crystallization within the center of a telescope mirror blank formed from a thermally crystallizable base glass composition to insure substantially uniform temperatures throughout the blank, resulting in overall control of the crystallization process whereby a transparent lightweight glass-ceramic mirror blank is formed having substantially uniform low-expansion properties.

Another object of this invention is to provide a process for forming a lightweight vitreous shaped article having a plurality of cavities therein, each cavity communicating to the atmosphere through small openings in a surface of the article.

Still another object of this invention is to provide a process for regulating the heat treatment of a lightweight vitreous shaped article having a plurality of cavities wherein the temperatures during the heat treating steps are substantially uniform throughout the article.

Still another object of this invention is to provide a process for making a lightweight, low-expansion, telescope mirror blank of substantial thickness and diameter, which may be readily cast and heat treated to the desired degree in a minimum length of time and at a relatively low cost.

Still another object of this invention is forming a lightweight, transparent, glass-ceramic telescope mirror blank wherein the blank has a coefficient of lineal thermal expansion of from minus $10 \times 10^{-7}$ to $10 \times 10^{-7°}$ C. (0–300° C.) and preferably of about zero.

A further object of this invention is to provide apparatus which is suitable for use in making vitreous and crystallized glass-ceramic lightweight articles of substantial thickness and having at least one and preferably a plurality of cavities therein.

Still another object of this invention is to provide apparatus for controlling the heat treatment of vitreous and crystallized glass-ceramic articles whereby all areas of the article are simultaneously subjected to substantially uniform temperatures during the treatment cycle.

In attaining these objects, one feature resides in forming a transparent glass-ceramic telescope mirror blank by maintaining a molten thermally crystallizable glass within a zone, which glass is preferably of the $SiO_2$—$Al_2O_3$—$Li_2O$ system, maintaining a plurality of shaped cores, each of which has a support member affixed thereto within the molten zone and having each of the cores completely immersed in the molten glass. The composition of the core is such that it absorbs the heat from the surrounding glass and subsequently melts and the molten material is poured out of the cast blank after the viscosity of the glass is increased such that the cast blank is self-supporting. The blank contains a plurality of cavities corresponding to the number and shape of the cores. By subjecting the cast blank, after removing it from the zone, to a particular heat treatment until the glass is thermally crystallized in situ, a low expansion transparent telescope mirror blank is produced containing as predominant crystalline phases lithium-containing crystalline phases, either as beta-eucryptite or beta-eucryptite-like crystals, or as beta-spodumene or beta-spodumene-like crystals, or both, as indicated by X-ray diffraction data. A multitude of such crystalline phases in random orientation and dispersed in the glassy matrix remaining as a result of in situ crystallization are to be found in the glass-ceramic mirror blank of the invention. Substantially all of the crystals of the glass-ceramic are of a diameter less than ⅓ micron measured along the largest lineal dimension of the crystals.

Another feature of the invention resides in utilizing metal cavity-forming cores having a hollow construction and continually passing a fluid through the hollow cores to keep the cores at a temperature below the melting temperature of the metal until such time as the viscosity of the cast mirror blank has increased to the point where the blank is self-supporting. By shutting off the fluid flow, the hollow metal cores melt due to the absorption of heat from the surrounding glass, and the molten metal is readily poured from the cavities formed in the cast blank.

Still another feature resides in controlling the temperature of the center portion of the cast blank during the subsequent heat treatment steps by passing heated gases maintained at accurately controlled temperatures into the cavities formed within the cast mirror blank so that substantially all portions of the blank can be at substantially uniform temperatures at the same times.

Other objects, features and advantages of the invention will become more apparent from the following discussion of the invention, taken in conjunction with the drawings, wherein.

Figure 1:
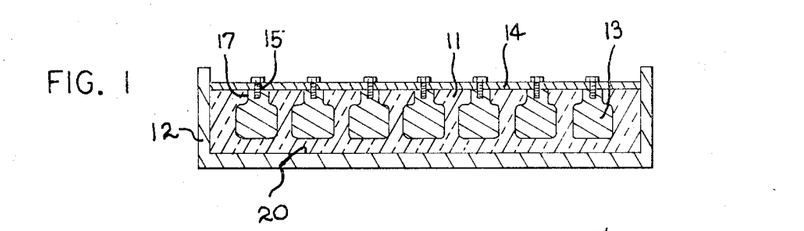
FIG. 1 is a cross-sectional view of a telescope mirror blank formed by the process of the present invention, shown cast within a mold and having the metal cores present within the blank and supported at the top of the mold.

In practicing the invention, the mirror blank 10, as shown in FIG. 1, may be formed by pouring a molten vitreous mass 11 into an annular mold 12 which is provided with a plurality of shaped cores 13 either suspended (FIG. 1) or supported (FIG. 2) within the mold 12 and completely surrounded by the vitreous mass 11.

The shaped cores 13 can be of any material which melts at a temperature from below the highest temperature to which the glass or cast body is to be subjected during treatment to any temperature above room temperature. Cores having a melting point within the temperature range of from about 100° F. below the fiber-softening point of the glass to about 800° F. below the annealing point of the glass are satisfactory for purposes of this invention, altohugh use of cores having a melting point from about the strain point of the glass to about 500° F. below the annealing point of the glass permits the process of the invention to be conducted more expeditiously. Ideally, the core should be of a material which melts at the annealing point of the glass. There should be enough heat in the glass to melt all of the core and yet not raise the core temperature above its melting point. Of course, the core mass, glass mass, original temperature of the core, original temperature of the glass, and heat loss from the system will all have to be taken into account.

The process of the invention is of particular importance in the production of mirror blanks made of thermally crystallizable glasses that are to be subjected to subsequent heat treatments to effect nucleation and crystal growth. Desirable properties, such as zero expansion, are thus obtained with the thermally crystallized transparent glass-ceramics resulting from the aforesaid heat treatments. Thermally crystallizable glasses, when cast in heavy sections, have the heat retained in the glass immediately after casting. This heat can start the nucleation process deep within the glass before it is desired, causing a non-uniform heat treated or nucleated condition. By utilizing the meltable cores of the invention, and particularly those cores which melt at or near the annealing point of the glass but below the nucleation point of the thermally crystallizable glass, the temperature within the glass is rapidly brought down to a predetermined temperature. The cast piece, after the molten metal is poured out, can then be placed in an annealing oven to start the controlled heat treatment and annealing cycle. As will be discussed infra, fluid jets may be placed within the cavities remaining after the molten metal has been removed, and air or other gases at accurately controlled temperatures can be discharged into the cavities to create more uniform temperature control within the mirror blank.

Figure 2:
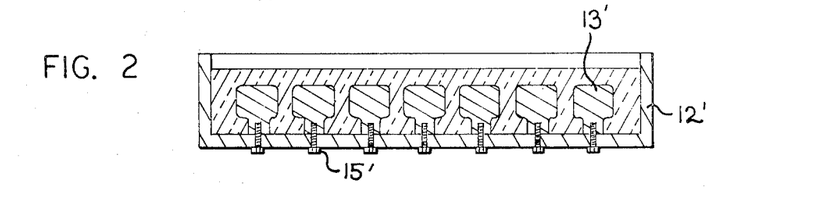
FIG. 2 is a cross-sectional view of a telescope mirror blank formed by another embodiment of the process of the present invention, showing the mirror blank cast in a mold wherein the metal cores are supported at the bottom of the mold.
Figure 5:
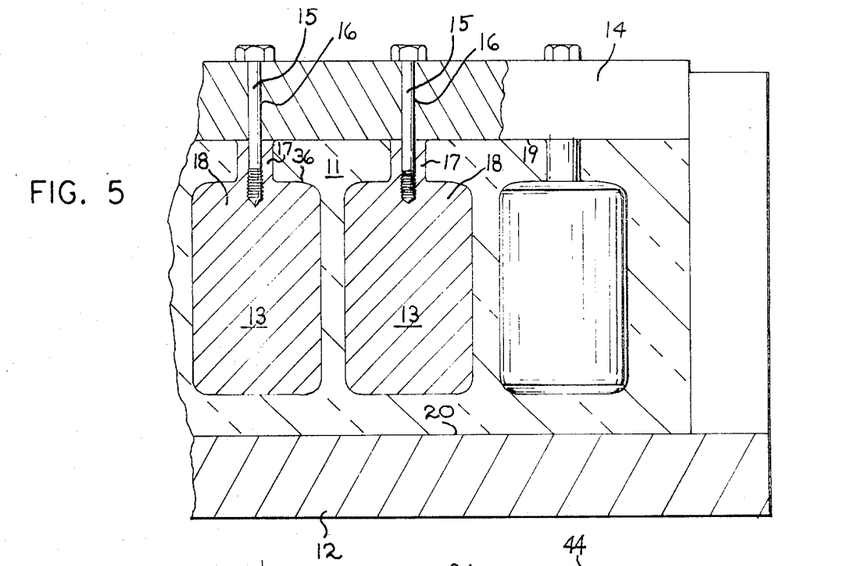
FIG. 5 is an enlarged cross-sectional view of a portion of a split-ring mold showing the metal cores suspended within the vitreous composition.

As more clearly shown in FIG. 5, the cores 13 are secured to press head or platen 14 by means of pins 15 passing through opening 16 in the platen and threaded within the neck 17 and upper portion 18 of the cores. The cores 13 are prepared by machining or precision casting metal parts of pure metal parts of pure metal or metal alloys having precisely the desired melting point. Thus the cores are equally spaced from the bottom surface 19 of the platen 14, and also equally spaced from the bottom surface 20 of mold 12. The neck 17 is preferably of the same material as core 13 and integral therewith, although it can be of another material and secured to the core by any one of several means available in the art. It is desirable to have the pins 15 of a different material than the core 13, which material has a melting point higher than that of the glass, although good results are obtained when the pin is of the same material as the core. In the latter event, that portion of the pin extending beyond the platen 14 into the core 13 is also melted during the process. The same fastening means discussed above with respect to FIGS. 1 and 5 can be utilized to support the cores 13' within mold 12', as illustrated in FIG. 2.

The cores 13 are attached to the platen or press head 14 in any desired pattern. The platen 14 with cores 13 attached is heated within an appropriate oven to a predetermined temperature below the melting point of the cores. Mold 12 is then filled with a predetermined quantity of molten glass 11 and the mold moved under the platen 14 which is brought down with a rapid but uniform motion inserting the cores in the glass. The cores are released from the platen by simultaneous unthreading of the pins 15 therefrom (means not shown) if the cores have not yet melted, and the platen is retracted, leaving the cores in the glass. If the cores have melted the pins are easily pulled therefrom upon retraction of the platen. Other means for mounting cores 13 upon platen 14 and for quickly disconnecting the cores from the platen after immersion will be apparent to those skilled in the art. The cores, being at a temperature at or near the annealing point of the glass but below the melting temperature of the metal, will chill the glass immediately on contact with the cores to the melting point of the metal. The glass in contact with the metal will become sufficiently rigid to prevent movement or distortion thereof. Glass not in contact with the metal will, of course, be considerably hotter. Heat will flow through the glass to the metal, causing a portion or all of the metal to melt, and such heat will continue to flow until a state of equilibrium is approached. The excess heat in the glass will be stored in the liquid metal in the form of heat of fusion. If the mass of glass tends to cool off too quickly because of loss of heat to its surroundings, the molten metal will give up its heat of fusion to the glass and will keep the glass at the fusion temperature of the metal.

If the core material is selected to melt at or about the annealing point of the glass, the heat of fusion in the cores will retain the temperature of the glass at or about its annealing temperature. The molten core material can be removed just prior to placing the cast glass piece into the annealing oven or provisions can be made to invert the cast piece within the oven for the removal of the molten cores. Alternatively, and again depending upon the melting point of the core, the cast blank, upon removal from the mold, can be placed upon a work support with the surface of the blank having the openings therein in contact with the support. The support is provided with sufficient openings therethrough to permit rapid and easy flow of the molten core material from the cast body into or through the work-support to suitable collection means for recovering the core material for possible reuse. The point at which the core material melts and flows out of the blank will depend upon the material per se and the temperature of the blank. Thus, the core material can be in molten from when the cast blank is removed from the mold, or it can subsequently melt when the blank is being annealed or subjected to the higher temperatures of nucleation and crystallization within the appropriate heating chambers.

Among the core materials suitable for the purposes of this invention are aluminum, magnesium and other metals and elements, alloys of aluminum, magnesium and other metals, and inorganic salts or other inorganic compounds, for instance compounds of aluminum, magnesium, and other metals. Such materials should be relatively inert to the glass compositions utilized in the process of the invention.

For instance, a meltable salt mixture, such as the well-known heat-transfer salt consisting of 40% $NaNO_2$, 7% $NaNO_3$, and 53% $KNO_3$ (this salt should be used at temperatures of 800° F. or less); an eutectic mixture of calcium oxide and $P_2O_5$ containing about 6½ weight percent CaO; an eutectic mixture of PbO and $V_2O_5$ containing about 50 mol percent PbO; or a low-melting glass containing about 14 weight percent PbO, 20 weight percent $B_2O_3$, 40 weight percent ZnO, 13 weight percent $SiO_2$, and 13 weight percent CuO. Such a glass has an annealing point of about 470° C., and a fiber-softening point below 600° C., and an average linear coefficient of thermal expansion of $50 \times 10^{-7}$ (0.425° C.).

For example, it is desired to stabilize the temperature of a thermally crystallizable cast glass blank at about 1180° F. before starting the desired heat treat cycle to thermally crystallize the glass into a low-expansion glass-ceramic. An alloy of aluminum and copper, known to the trade as aluminum alloy 2024–T–351, is chosen as the core material, which alloy has a melting point of 1180° F. The metal would have an average specific heat of about 0.224, a heat of fusion of about 167.4 B.t.u. per pound, and a specific gravity of about 2.7. If the mirror blank was to weight about 50% of a solid blank, a mirror blank 36″ in diameter and six inches thick, if solid, would weight 530 pounds, while the light weight mirror blank of the invention would weight 265 pounds. The aluminum alloy required to produce the voids in the blank would have a total weight of 286 pounds and the heat of fusion required to melt the amount of metal would be about 47,876 B.t.u. If the average temperature of the glass in the mold as it arrived at the pressing operation, i.e., poured into the mold prior to insertion of cores, is 2500° F., the total heat in the glass between 2500° F. and 1180° F., assuming an average specific heat in the glass of 0.292, would be 102,142 B.t.u., or 54,266 B.t.u. more than enough to supply the heat of fusion of the metal. This additional heat from the glass is dissipated by permitting it to raise the temperature of the metal from the predetermined metal preheat temperature to the fusion temperature of the metal. The theoretical preheat temperature is calculated for the 286 pounds of metal with a specific heat of .224 as 846° F. below the fusion temperature of 1180° F., or 334° F. In practice, a preheat temperature in excess of the theoretical 334° F., say 400° F. or 500° F., would be used to insure that all of the metal will be melted. If all of the metal does not melt, however, it will be melted and permitted to flow out in a subseuent heat treating process.

The analysis of aluminum alloy No. 2024–T–351 is as follows:

|  | Percent |
|---|---|
| Silicon | .5 |
| Iron | .5 |
| Copper | 3.8–4.9 |
| Manganese | .3–.9 |
| Magnesium | 1.2–1.8 |
| Chromium | .1 |
| Zinc | .25 |
| Impurities | .15 |
| Aluminum | Balance |
| Specific heat | .224 |
| Heat of fusion (B.t.u./lb.) | 167.4 |
| Specific gravity | 2.7 |

Figure 3:
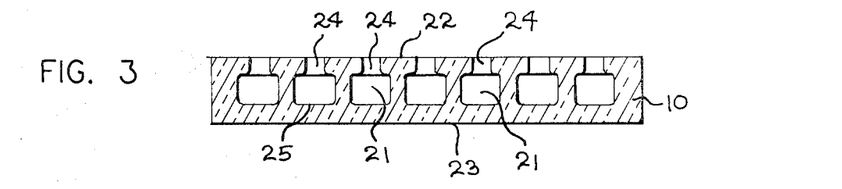
FIG. 3 is a cross-sectional view of a one-piece telescope mirror blank formed by the apparatus illustrated in FIG. 1 and showing the plurality of cavities formed therein.

The molten metal within the cast glass piece 10 can be rapidly poured out into a suitable receptacle (not shown) by inverting the piece 10. The resulting cast glass piece, such as a mirror blank, has the structure shown in FIGS. 3 and 4, namely, a plurality of spaced cavities 21 disposed between the two outer surfaces 22, 23, and openings 24 disposed above and communicating with each cavity. All of the openings 24 are of smaller cross-sectional area than the cross-sectional area of the cavity 21. Cavities 21 can, of course, be of different shapes, which shapes are governed by the outer configuration of the cores 13 utilized in casting the mirror blank. Best results are obtained when the corners of the cores are rounded so as to permit ready flow of the molten core material from the cavities.

Figure 4:
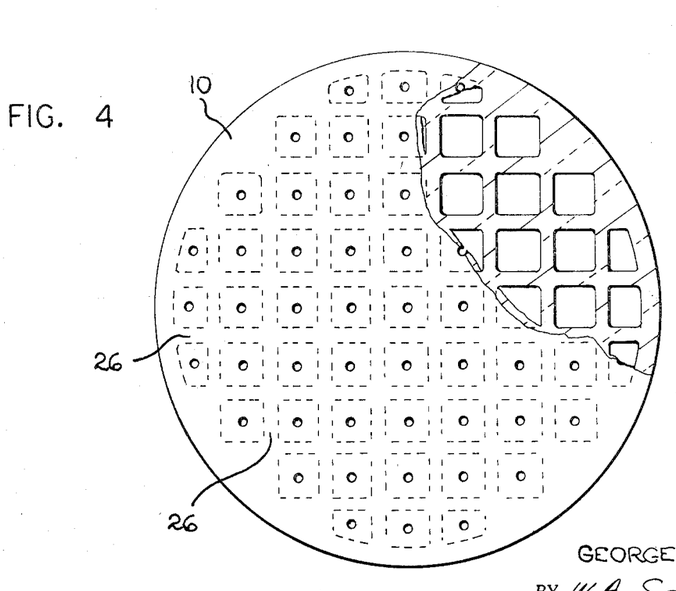
FIG. 4 is an enlarged plan view of the underside of the annular telescope mirror blank of the invention illustrated in FIG. 3, showing the plurality of openings disposed above the individual cavities, and showing the cavities in the broken-away portion of the mirror blank.

In the preferred embodiment, the bottom surfaces 25 of each of cavities 21 are eually spaced from the surface 23 of the mirror blank 10, which surface 23 eventually becomes the reflecting surface of the telescope mirror. Due to the symmetrical arrangement of the shaped cores in the mold, the resulting mirror blank as shown in FIG. 4 has a plurality of spaced cavities in parallel rows forming a series of ribs 26 extending in two directions perpendicular to each other, the thickness of the rib portions at the elevation where openings 24 communicate with cavities 21 preferably being less than the distance between cavities 21 and surface 23 that will be mirrored.

While the bottom surface 20 of the mold 12 may be flat, as shown in FIG. 1, it may, preferably, be of convex configuration so as to impart a concave surface on the bottom of the vitreous mass cast therein. By the process of this invention, shaped glass and glass-ceramic articles of heavy thickness, such as telescope mirror blanks, may be formed, which mirror blanks have the various configurations described and illustrated in copending application Ser. No. 437,431, filed Mar. 5, 1965, and assigned to the same assignee as the present application.

Figure 6:
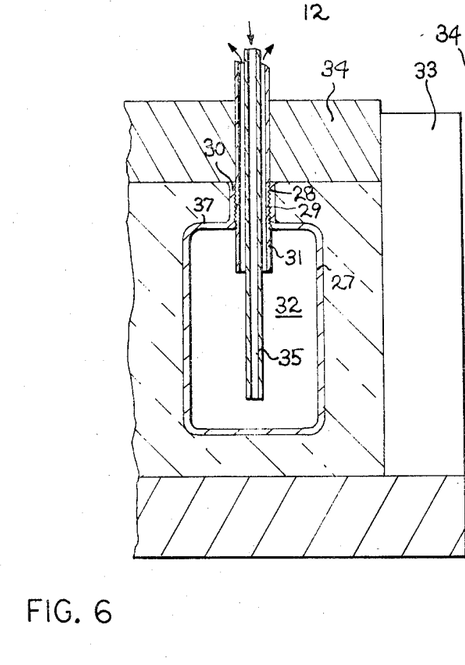
FIG. 6 is an enlarged cross-sectional view of a portion of a mold and cast mirror blank of the type illustrated in FIG. 5 and showing another embodiment of the metal cores suspended within a vitreous composition.

In FIG. 6 of the drawing there is disclosed another embodiment of a shaped core 27 to be used in lieu of the solid cores 13 previously discussed. Core 27 is hollow and can be formed of the same materials as cores 13. Core 27 is provided with an integral neck portion 28, the inner surface 29 of which is threaded, and is in removable engagement with the threaded portion 30 of annular tube 31 which projects into the interior 32 of the core member 27. Tube 31 is in communication with the outside of the mold 33, i.e., the outer surface of platen or press head 34. While tube 31 is shown in threaded engagement with core 27, other means for suspending the cores to the under surface of the platen and having tube 31 pass through the platen 34 into core 27 will be readily apparent to those in this art. Disposed within tube 31 and also extending into the interior 32 of core 27 is a second tube 35. The temperature of the core 27 can be carefully controlled at all times by continuously passing into the cavity 32 through tube 35 a heated fluid, such as air or other gases which are inert with respect to the material of the core and the vitreous mass, or a liquid which retains its physical characteristics at the high temperatures involved. The rate of flow of fluid through tube 35 into cavity 32 and out of the core 27 through tube 31 can be regulated so that the temperature of the core 27 is substantially uniform.

As described above with respect to the embodiment of the invention shown in FIG. 1, a plurality of hollow cores 27 can be substituted for the solid cores 13 in the platen, each of cores 27 being provided with a fluid inlet tube 35, and all of which tubes are in direct communication with a source of heated fluid (not shown), such as air, other inert gases, water, other inert liquids, and the like. All cores are also provided with an outlet tube 31, all of which may, if desired, return the heated fluid to the aforesaid source to be further heated or cooled as the case may be, and recirculated through the cores 27.

While inlet tube 35 has been shown disposed within outlet tube 31, the flow of the fluid through the tube can be interchanged so that the fluid enters the interior 32 of the core through tube 31 and exits through tube 35. The amount of penetration of the tubes into the core will be determined by the fluid being utilized and the temperature at which the core 27 must be maintained.

As soon as the cores 27, mounted on platen 34 and heated to a temperature below the melting point of the core material, are immersed in the mold containing the predetermined amount of vitreous mass therein, the glass around the cores and in contact therewith is chilled and becomes sufficiently rigid to prevent movement or distortion thereof. The glass not in contact with the cores will be hotter. The heat of the glass imparted to the ouer surfaces of he cores 27 is conducted inwardly and absorbed by the fluid passing continuously through the cores 27 by means of inlet tubes 35 and outlet tubes 31. Such heat is rapidly carried away and the temperature of the cores is maintained at below the melting point of the material forming the cores. As soon as the viscosity of the glass about the cores increases to a point where the glass is self-supporting, the fluid flow is stopped and, preferably, all fluid withdrawn from the cores 27. Tubes 31 are disengaged simultaneously from all cores and the platen 34, together with tubes 31 and 35, is lifted from mold 33. This operation takes only a few seconds. Since the cooling medium is no longer present in the cores, the heat still within the cast glass piece is sufficient to melt the hollow cores 27 and, upon inverting the cast piece, the molten metal is poured out into a receptacle (not shown). To assist in the pouring out of the molten metal from the cavities formed in the mirror blank, it is desirable to make the cores 13 and 27 with shoulders 36 and 37, respectively, which taper downwardly and outwardly from the junction with the neck portions 17 and 28 respectively. Since the formed cavities assume the configuration of the cores, the chances of any metal not being poured therefrom and remaining in the cavity are very small.

Figure 7:
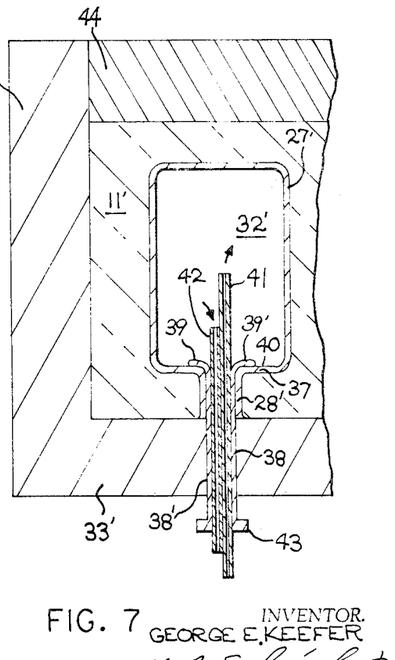
FIG. 7 is an enlarged cross-sectional view of a portion of a mold and cast mirror blank of the type illustrated in FIG. 2 and showing another embodiment of the metal cores of the type illustrated in FIG. 6 within a vitreous composition.

FIG. 7 illustrates still another embodiment of a hollow core 27', vertically supported at the bottom of mold 33' by means of plug 38 which is inserted through an opening 38' in the bottom of mold 33' and extends inwardly into the neck 28' of core 27'. The outer end of plug 38 is provided with a pair of flexible arms 39, 39' which, when inserted into the core, spread out and engage the inner surface 40 of the core shoulder 37'. The arms 39' 39' may be integral with plug 38 or may be separately formed and affixed thereto. A fluid inlet pipe 41 and fluid outlet pipe 42 are disposed within plug 38 and communicate with the interior 32' of core 27'. The other end of plug 38 is provided with an enlarged head 43. As will be understood, a plurality of cores 27' of the structure shown in FIG. 7 are mounted on the bottom of mold 33' in a particular pattern, such as shown in FIG. 2, to form the mirror blank of FIG. 4. The cores are heated to below the melting point of the core material, but at or about the annealing temperature of the glass, by passing a fluid therethrough by means of inlet and outlet pipes 41, 42. The vitreous mass 11 is then poured into the mold and the mold closed by lowering platen 44 to the position shown in FIG. 7. As soon as the glass has cooled sufficiently to be self-supporting, the fluid flow is stopped, and the plugs 38, together with pipes 41, 42 are withdrawn from the base of mold 34' by exerting a downward force on caps 43 sufficient to permit flexible arms 39, 39' to be straightened as they are pulled through openings 38'. The heat remaining in the glass is sufficient to melt the cores 27' and the molten metal pours through openings 39 into a suitable receptacle therefor (not shown). The cast glass piece is removed from the mold for further heat treatment, and has the structural configuration shown in FIGS. 3 and 4.

Figures 8, 9, 10, 11, 12:
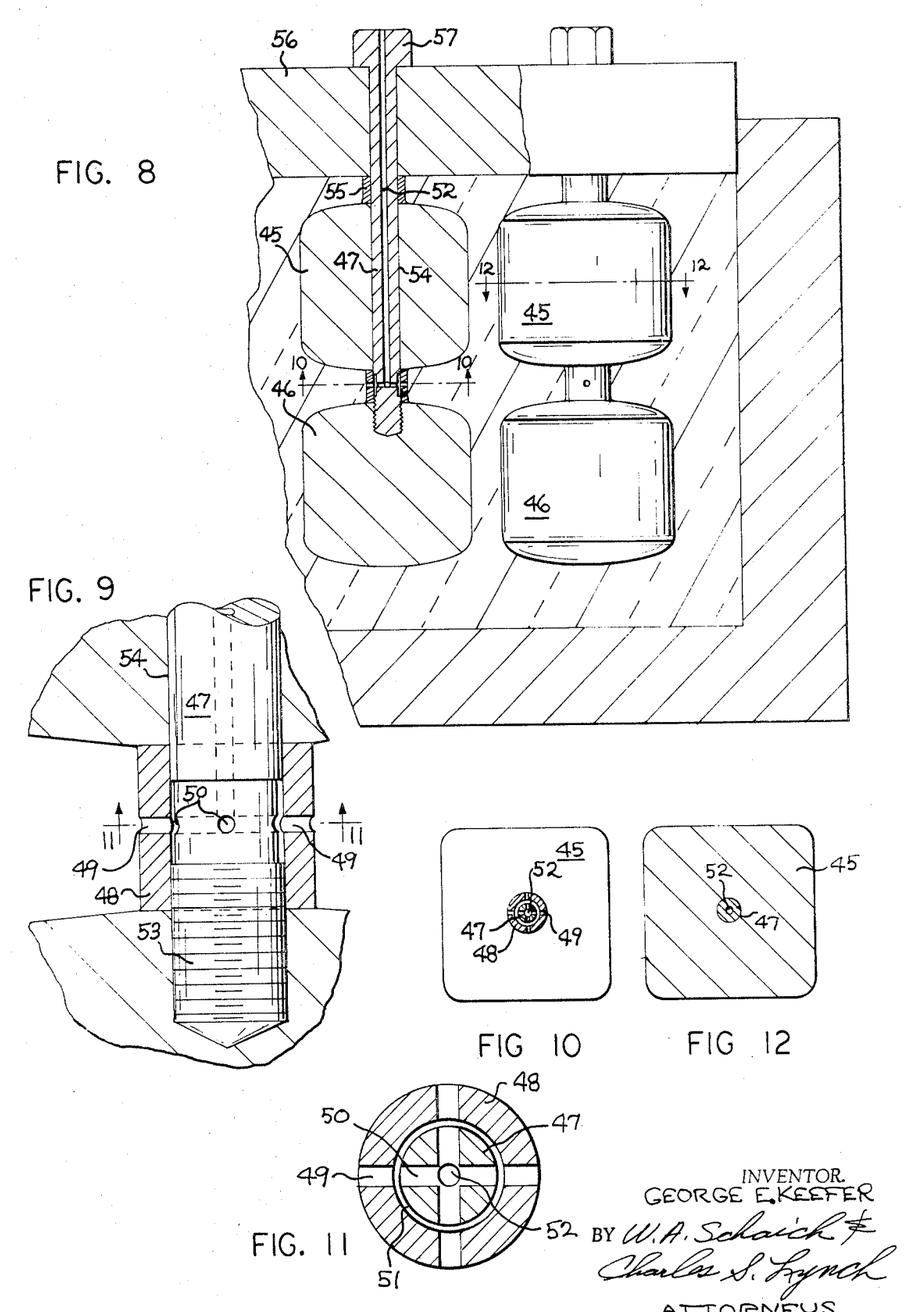
FIG. 8 is an enlarged cross-sectional view of a portion of a mold and cast mirror blank, partially broken away, and showing a different embodiment of metal cores suspended within the vitreous composition.
FIG. 9 is an enlarged cross-sectional view showing the structural connecting features between the vertically adjacent metal cores of FIG. 8.
FIG. 10 is a cross-section view taken along the lines 10—10 of FIG. 8.
FIG. 11 is a cross-section view taken along the lines 11—11 of FIG. 9.
FIG. 12 is a cross-sectional view taken along the lines 12—12 of FIG. 8.

Still another embodiment of the invention is illustrated in FIG. 8, wherein a pair of shaped, vertically disposed and spaced cores 45, 46 are mounted about pin 47 which is threaded into core 46. Annular member 48 is disposed between cores 45, 46 and is provided with a plurality of openings 49 which communicate with openings 50 disposed about recessed portion 51 of pin 47. Openings 50, in turn, communicate with longitudinally extending openings 52 in pin 47 which in turn communicates with a vacuum source (not shown). Pin 47 has a threaded portion 53 which is removably secured to the upper portion of core 46 and extends through annular member 48, through openings 54 in core 45, through a second annular member 55 which is in contact with the undersurface of platen 56 and terminates in an enlarged head portion 57. The operation of the apparatus of FIG. 8 is similar to that described above with respect to FIG. 5. Once the platen 56 is lowered over the mold 58 and the cores 45, 46 are immersed in the molten vitreous mass, a vacuum is applied through openings 52, 50 and 49 sufficient to assist the flow of molten glass about annular member 48 and the space between the cores 45, 46. All of pins 47 are then simultaneously rotated to unthread the lower portion from core 46, permitting removal of the pin and platen from the self-supporting cast glass mirror blank in the mold. The cores 45, 46 and members 48, 55 absorb heat from the glass and become molten. By inverting the blank, the molten metal is poured from the blank and a plurality of cavities 59, 60 are formed therein, and correspond to the shape of the cores.

In the preferred embodiment of the invention, annular members 48, 55 are of the same composition as cores 45 and 46, and melt at the same time as the cores. The pin 47 is made of a metal or metal alloy which is resistant to the high temperatures involved in the process and is not affected thereby. The glass is sufficiently rigid so as to prevent rotation of the cores when pins 47 are removed from threading engagement with cores 46.

Figure 13:
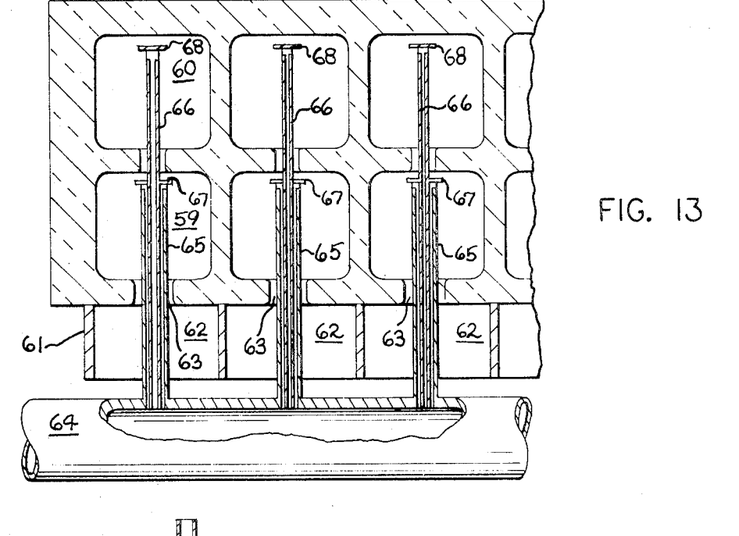
FIG. 13 is a cross-sectional view of a portion of a cast telescope mirror blank and apparatus for heat treating the inner portion of the cast blank.

In one embodiment of apparatus suitable for use in subsequently heat treating the cast mirror blank, reference is made to FIG. 13 wherein the hot cast blank 60, after the molten metal cores are poured therefrom, is transferred to a work support grid 61 comprising a plurality of openings 62 disposed beneath the openings 63 in the blank which are in communication with cavities 59 and 60. Work support grid 61, in turn, is disposed over convection duct 64 whch is provided with a plurality of vertical tubes 65 terminating in cavities 59. Tubes 65 also have vertically extending tubes 66 passing therethrough and terminating in cavities 60. Each of tubes 65 and 66 have baffles 67, 68, respectively, positioned at the outer ends thereof so that a fluid, such as air or other gases, passing through tubes 65, 66 from duct 64 impinges on the baffles 67, 68 and is uniformly disseminated through the respective cavities. As shown in FIG. 13, the fluid passes out of the cavities through openings 63 into the atmosphere, although means can be readily provided for collecting the fluid and recycling it through convection duct 64 after the fluid has been heated to the desired temperature necessary for treating the blank. Following the heat treatment in accordance with the invention, the duct 64 and attached tubes 65, 66 can be lowered relative to grid 61, or grid 61 and mirror blank supported thereon can be raised relative to duct 64 and tubes 65 and 66.

Thus, utilizing the apparatus disclosed in FIG. 13, a cast mirror blank undergoing treatment in an annealing oven can be maintained at substantially uniform temperatures throughout its interior by directing fluid into the cavities 59, 60, which fluid is maintained at the temperature within the annealing oven. Such temperature control is extremely important when the cast mirror blank is formed of a thermally crystallizable glass composition. Strict control over the nucleation and subsequent crystallization of the glass must be maintained in order to form a blank having substantially uniform thermal expansion properties throughout the blank. Any premature crystallization in any portion of the blank will result in a mirror blank having nonuniform expansion properties and, in some instances, crystal growth will proceed to where an opaque layer or area may form within the blank, further affecting the expansion properties of the blank, and, in many cases, destroying the effectiveness of the blank for use as a telescope mirror.

Figure 14:
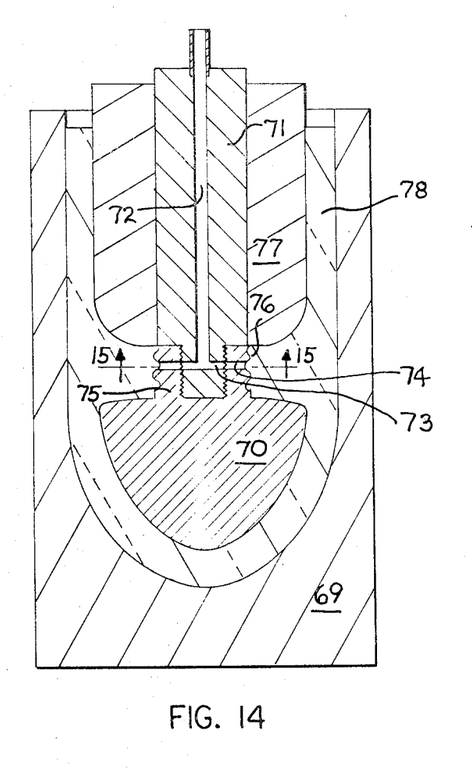
FIG. 14 is a vertical cross-sectional view of another embodiment of the present invention.
Figure 15:
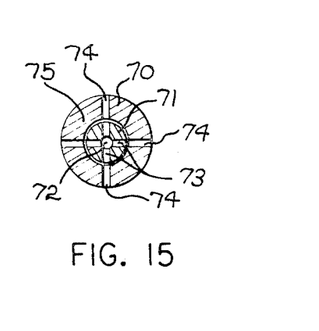
FIG. 15 is a view taken along lines 15—15 of FIG. 14.

Still a further embodiment of a process of the present invention is shown in FIG. 14 wherein a molten glass composition from a gob, gather, or stream is introduced into mold 69 and an expendable metal core 70 threadingly engaged to plunger 71 is moved into the position shown in FIG. 14. The excess glass forms a pool over the core 70. Plunger 71 is provided with a longitudinally extending opening 72 connected at its upper part to vacuum means (not shown). A plurality of radially extending openings 73 are in communication with opening 72 at the lower end of plunger 71 and, in turn, are in communication with openings 74 in the neck portion 75 of core 70. As soon as the plunger 71 immerses core 70 into the molten glass, sufficient vaccum is supplied to opening 72 to facilitate the flow of molten glass about the neck portion 75 so that the glass completely assumes the configuration of the core neck. As shown in FIG. 14, the resulting glass piece which is cast will have a threaded inner portion 76 which may be detachably secured to any desired member correspondingly threaded.

As soon as the vacuum is applied, the conventional plunger 77 is brought down to complete the shape in the upper portion of the mold 69. Plunger 77 is withdrawn from the mold as soon as the viscosity of the molten glass is increased so as the glass becomes self-supporting, i.e., from about five to fifteen seconds. The cast glass 78 containing the meltable core shape 70 is removed from the mold. The heat in the glass is sufficient to melt the core 70 so that the threaded connection between the plunger 71 and core 70 no longer holds, thus permitting plunger 71 to be removed.

In an alternate arrangement, plunger 71 may be connected to core 70 by a quick disconnect coupling which can be actuated by mechanical means, such as an interrupted thread, bayonet clip lock, mechanical wedging action, or even by use of vacuum to maintain a locking relation between plunger and core.

In still another arrangement of the members illustrated in FIG. 14, the core 70 and plunger 77 may be simultaneously inserted into mold 19 containing the predetermined amount of molten glass. As will be understood by the art, the core 70 may be of a configuration such that instead of threads 76 being formed in the neck wall of the cast body, the wall may be smooth and vertical or, if desired, tapered in any direction. Many variations in the process and apparatus for forming a cast vitreous or crystalline glass body having at least one cavity therein larger than the opening by which the cavity communicates with an adjoining hollow area or with the atmosphere, will be apparent to those having ordinary skill in the art, from the basic disclosure in FIG. 14, and all such variations will be understood to be within the scope of the invention as defined in the claim, infra. For example, core 70, affixed to plunger 71, can be immersed into the molten glass, which is allowed to flow up to and about the neck portion 75. Plunger 77 is then brought down into position and molten glass is displaced upwardly in mold 69 about plunger 77. In this two-step arrangement, no vacuum is needed to assure complete flow of the glass about neck 75.

By the process illustrated in FIG. 14, portions or all of the external mold shape can be made of normal reusable solid mold materials. That portion of the mold shape that cannot be extracted because of interference with the completed glass part is made of a material such as that described above. When a thermally crystallizable glass composition is utilized, the melting point of the core material should be below the nucleation temperature of the glass composition. If desired, a hollow core may be used wherein cooling fluids are continuously passed therethrough in the manner described above with respect to the invention illustrated in FIGS. 6 and 7.

The metal for the cores should be selected for both its melting point and its heat of fusion. Ideally, the core material should have a melting point just above the annealing point of the glass. The core material may be heated to a temperature near its melting point before being inserted into the glass or before having the glass formed around it. The specific heat of the core material and the weight of the material used should, ideally, be selected to melt the major portion of the core while the temperature of the glass is brought down to the melting point of the core material.

For many of the preferred crystallizable glass compositions suitable for the purposes of this invention, the annealing temperature of the glass is within the range of about 1150°–1300° F., while the nucleation temperature is within the range of about 1350°–1425° F.

The following example is merely illustrative of an embodiment of the invention, and it is to be understood that the scope of the invention is not to be considered in any manner limited thereby.

EXAMPLE 1

A thermally crystallizable molten glass having a temperature within the range of 2650–2750° F. is poured into a split-ring graphite mold having a convex bottom surface, which mold has been preheated to 400° F. The mold being 16″ in diameter, it takes approximately 15 seconds to pour the molten glass therein to the desired depth. As soon as the glass flow stops, the upper plate of the mold having a symmetrical arrangement of a plurality of shaped cores of aluminum alloy No. 2024–T–351 having a melting point of 1180° F., of the configuration shown in FIGS. 1, and 5 suspended from its bottom surface, is lowered onto the mold so that all of the cores are immersed below the molten glass surface in the manner shown in FIG. 1. The cores are previously heated to about 500° F. prior to their immersion into the molten glass. As soon as the cores are immersed, the pins are disengaged and the upper plate is lifted from the mold. As soon as the viscosity of the glass increases to a point where the glass is self-supporting, the split-ring mold is opened and the glass assembly is inverted onto a work-support having a plurality of openings therethrough into which the molten material pours out from the cast plank, leaving a plurality of cavities in the cast blank. A total time of about 6 minutes elapses from the time the glass is first poured into the mold.

The self-supporting glass assembly together with the work-support is promptly placed into an oven which has been preheated to a temperature of 1000° F. and whose temperature is increased to 1150° F. due to the presence of the hot assembly therein, and the assembly is maintained in the oven for a period of three hours at this temperature.

The temperature in the oven is then increased to 1350° F. at the rate or about 5° F. per minute and the assembly maintained therein for 50 hours at this temperature. At the end of this time, the assembly is cooled at the rate of 1° F. per minute until the temperature of 1000° F. is reached, and then the cooling rate is increased to slightly less than 5° F. per minute until room temperature is reached. A transparent thermally in situ crystallized glass-ceramic mirror blank 3½ inches thick is formed and has a coefficient of lineal thermal expansion of zero $\pm 1 \times 10^{-7}$° C. (0–300° C.).

The thermally crystallizable glass used in the foregoing example, which produced a thermally, in situ, crystallized transparent glass-ceramic telescope mirror blank was prepared by first melting together the following batch ingredients expressed in pounds and ounces:

| Ingredient— | Parts |
|---|---|
| Petalite [1] | 405 lbs. 14 oz. |
| Zircon sand [2] | 15 lbs. 2.5 oz. |
| Alumina [3] | 39 lbs. 1 oz. |
| Boric acid [4] | 30 lbs. 5 oz. |
| High-calcium limestone [5] | 24 lbs. 8.5 oz. |
| Zinc oxide | 6 lbs. 5 oz. |
| Lithium carbonate | 5 lbs. 5 oz. |
| Titanium dioxide [6] | 9 lbs. 1.5 oz. |
| Niter | 1 lb. 4 oz. |
| Sodium antimonate | 1 lbs. 11 oz. |

[1] 4.2% $Li_2O$, 16.1% $Al_2O_3$, 77.7% $SiO_2$, 0.4% $Na_2O$, 0.027% $Fe_2O_3$, and other minor ingredients, and taking into consideration an ignition loss.
[2] Analysis of zircon sand is 33.8% $SiO_2$, 65.5% $ZrO_2$, 0.12% $TiO_2$, 0.05% $Fe_2O_3$, 0.24% $Al_2O_3$, and 0.2% cerium oxide and possibly rare earth oxide.
[3] Weight of Alcoa A–14 alumina which is illustratively 99.5% $Al_2O_3$, 0.03% $Fe_2O_3$, 0.10% $Na_2O$, 0.08% $SiO_2$, 0.2% ignition loss at 1100° C.
[4] 56.2% $B_2O_3$.
[5] Limestone analyzing 55.25% CaO, 0.26% MgO, 0.5% $SiO_2$, 0.2% $Al_2O_3$, 0.05% $Fe_2O_3$, 0.001% $Cr_2O_3$, 0.03% sulfate ($SO_3$), 0.02% $P_2O_5$ and an ignition loss of 43.6%.
[6] Weight of Titanox-GM which is a nonpigmentary grade of substantially pure $TiO_2$ sold by Titanium Pigment Corporation.

This glass has the following theoretical composition and for an actual tank batch had the following analyzed composition, expressed as various oxides in weight percent.

| | Theoretical, percent | Analyzed, percent |
|---|---|---|
| $SiO_2$ | 64.0 | 63.7 |
| $Al_2O_3$ | 20.9 | 21.4 |
| CaO | 2.7 | 2.8 |
| ZnO | 1.3 | 0.98 |
| $Li_2O$ | 3.9 | 3.80 |
| $B_2O_3$ | 3.4 | 2.96 |
| $TiO_2$ | 1.8 | 1.91 |
| $ZrO_2$ | 2.0 | 1.98 |
| $K_2O$ | 0.2 | 0.18 |
| $Na_2O$ | | 0.65 |
| $Sb_2O_3$ | 0.4 | 0.32 |

The difference between theoretical and actual compositions are believed to be due primarily to alumina pick-up from the refractory of the furnace and to $B_2O_3$ and ZnO losses by volatilization.

Based upon the heat treatment, as described above, that is given to this glass, the glass-ceramic obtained should have a thermal coefficient of lineal expansion of minus $0.2 \times 10^{-7}$ per ° C. (0–300° C.).

EXAMPLE 2

Another example of a preferred thermally crystallizable glass which by suitable heat treatment, as described below, can produce an astronomical telescope mirror blank of glass-ceramic with a thermal coefficient of lineal expansion of $0 \times 10^{-7}$ per ° C. is described below. The heat treament for this glass differs from that described in Example 1 in that, after maintenance at 1150° F. for a period of three hours, the oven temperature is raised, at the rate of 5° F. per minute to 1425° F. rather than to 1350° F., and is maintained at 1425° F. for 48 hours. Otherwise, the process is that described for Example 1.

This glass is prepared by first melting together the following batch ingredients expressed in parts by weight:

| Ingredient— | Parts |
|---|---|
| Petalite [1] | 427 lbs. 14 oz. |
| Zircon sand [2] | 15 lbs. 2 oz. |
| Alumina [3] | 35 lbs. 8 oz. |
| High-calcium limestone [4] | 24 lbs. 9 oz. |
| Zinc oxide | 6 lbs. 5 oz. |
| Lithium chloride | 2 lbs. 9 oz. |
| Lithium nitrate | 1 lb. 7 oz. |
| Titanium dioxide [5] | 9 lbs. 2 oz. |
| Sodium antimonate | 2 lbs. 8 oz. |

[1] Petalite composition is as described above following the tabulation of batch ingredients for the other glass described in detail.
[2] Zircon sand is also as described earlier.
[3] Weight of Alcoa A-14 alumina which is illustratively 99.6% $Al_2O_3$, 0.03% $Fe_2O_3$, 0.04% $Na_2O$, 0.12% $SiO_2$, 0.2% ignition loss at 1100° C.
[4] Limestone is also as described above.
[5] Weight of Titanox–GM which is also described above.

This glass has the following theoretical composition and for an actual tank batch had the following analyzed composition, expressed as various oxides and one chemical element in weight percent:

| | Theoretical, percent | Analyzed, percent |
|---|---|---|
| $SiO_2$ | 67.4 | 67.5 |
| $Al_2O_3$ | 20.9 | 22.1 |
| CaO | 2.7 | 2.6 |
| ZnO | 1.3 | 0.5 |
| $Li_2O$ | 3.9 | 3.59 |
| $TiO_2$ | 1.8 | 1.9 |
| $ZrO_2$ | 2.0 | 1.95 |
| $Na_2O$ | 0.5 | 0.80 |
| Cl | 0.2 | Not analyzed |
| $Sb_2O_3$ | 0.4 | Not analyzed |

The differences are believed to be due to alumina pickup and volatilization loss in the case of ZnN.

While telescope mirror blanks of the present invention may be formed utilizing known vitreous compositions which have been shown to be suitable for telescope mirrors in the past, such as fused quartz, borosilicate glass, and the like, it is preferred to utilize thermally crystallizable glasses of the $SiO_2$—$Al_2O_3$—$Li_2O$ system, capable of being thermally, in situ crystallized to form transparent glass-ceramics having a coefficient of lineal thermal expansion which is low and preferably is about zero.

Transparent, low-expansion, glass-ceramic telescope mirror blanks may be formed by thermal in situ crystallization of the preferred thermally crystallizable base glass composition of the present invention, which composition consists essentially of the following components, in the indicated percent limits, based on the total glass composition:

| Component— | Weight percent |
|---|---|
| $SiO_2$ | 56–70 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| ($SiO_2$+$Al_2O_3$) | At least 82 |
| ($SiO_2$+$Al_2O_3$+$B_2O_3$+$P_2O_5$) | 86–91 |
| CaO+MgO+ZnO+$Na_2O$ | 2.5–6 |
| ($SiO_2$+$Al_2O_3$+$P_2O_5$+$Li_2O$) | No more than 93 |
| ($Ti_2O$+$ZrO_2$) | 2–6 | wherein the ratio of (CaO+MgO+ZnO+$Na_2O$+$B_2O_3$) to $Li_2O$ is less than 2.4 and the ratio of $SiO_2$ to $Al_2O_3$ is no more than 3.8. The transparent, crystallized glass-ceramic formed, as was formed in Example 1 above, contains as predominant crystalline species lithium-containing crystalline phases selected from the group consisting of beta eucryptite or beta-eucryptite-like crystals, or as beta-spodumene or beta-spodumene-like crystals, or both, as indicated by X-ray diffraction data. The ceramic contains a multitude of such crystalline species which are in random orientation throughout the ceramic and which are dispersed in the glassy matrix remaining as a result of the in situ crystallization. Substantially all of the crystals of the ceramic are of a diameter less than ⅓ micron measured along the largest lineal dimension of the crystals. The glass-ceramic has a lineal coefficient of thermal expansion of about *minus* $10 \times 10^{-7}$ to $10 \times 10^{-7}$ (0–300° C.) and, preferably, from —3 to $3 \times 10^{-7}$ (0–300° C.). The ultimate telescope mirror blank and telescope mirror formed therefrom is one in which the lineal coefficient of thermal expansion of the glass-ceramic is about zero. Furthermore, while the diameter of the crystals within the ceramic is preferably less than ⅓ micron measured along the largest lineal dimension of the crystals, it is preferred that the crystals be of a diameter less than ¼ micron in size, and best results are evident when the diameter is less than ⅒ micron in size.

Other transparent, low-expansion, crystallized glass-ceramics formed by thermal in situ crystallization of a thermally crystallizable base glass are disclosed in copending application Ser. No. 396,011, filed Sept. 14, 1964, and in the continuation-in-part thereof filed June 29, 1965, and in copending application Ser. No. 386,693, filed July 31, 1964 and now abandoned, and the continuation-in-part application thereof filed June 15, 1965, all applications being assigned to the assignee of the present application. All of the disclosures in the aforesaid applications relating to thermally crystallizable glass compositions and the process of heat treating said compositions to form transparent, low-expansion glass-ceramics of substantial thickness and diameter are incorporated herein by reference. As fully disclosed in the aforesaid pending applications, the final coefficient of thermal expansion of the glass-ceramic is determined by the composition of the thermally crystallizable glass and by the particular heat treatment to which it is subjected.

A mirror blank having a concave surface can be made in accordance with the process disclosed in Example 1 by inverting the mold containing the hot self-suporting glass onto a convex surface and then permitting the glass to slump thereon and assume the configuration of the supporting surface. It will be appreciated that by making a surface of the blank concave, it will facilitate the grinding, polishing and figuring thereof to the desired configuration.

Furthermore, while graphite molds have been used in making the mirror blanks of the present invention, it is contemplated that the molds may be made of materials such as open cell type amorphous fused silica foam (Glassrock), low-expansion ceramics, and the like, which can be preheated to temperatures approaching that of the molten vitreous mass. It is preferred that when mirror blanks are to be made from a thermally crystallizable glass the cores should have rounded corners and edges as shown in FIGS. 8 and 10. This will minimize or prevent uncontrolled crystallization of the glass occurring at sharp edges or corners. Alternatively, the cores can be annular, conical, or of any suitable configuration, and do not necessarily have to be rectangular.

In order to prevent a thin coating of metal from the molten cores from remaining upon the cavity surfaces after the molten metal is poured therefrom, as sometimes occurs with certain metals, it is desirable to first coat the cores with a parting material, such as graphite.

It is to be understood, of course, that when light-weight telescope mirror blanks are to be formed from fused quartz, borosilicate, or other vitreous composition, the best treatment step will vary from that of Example 1 above, since in situ crystallization of the glass is not necessary. Such heat treatments are those well-known in the mirror blank art.

It is to be further understood that while the invention has been primarily described in terms of glass compositions forming vitreous or transparent glass-ceramic mirror blanks, the process of the invention can be utilized in making light-weight, opaque ceramic mirror blanks of the indicated configurations. In this event, the starting glass composition is such that an opaque ceramic is readily obtained therefrom, or the heat treating steps are varied, as is known in the part, to obtain the opaque ceramic rather than the preferred transparent glass-ceramic. While the transparent glass ceramic mirror blanks are obtained from crystallizable glasses of the $SiO_2$-$Al_2O_3$-$Li_2$ system described above, other systems may be used to obtain the opaque ceramic mirror blanks in accordance with the invention.

In the foregoing description of embodiments of the present invention, molten vitreous composition is poured into the mold. As an alternative, the mold may be filled with vitreous cullet which is then heated to a temperature sufficient to melt it within the mold.

A transparent, low-expansion telescope mirror blank of the present invention, formed by the process disclosed herein, has its base plate surface, which is preferably concave, ground, polished, and figured, i.e., a proper parabolic curve is formed on the surface. A thin coating of aluminum is then applied to the prepared surface in a conventional manner to form the reflecting surface.

In the foregoing description of the method of the present invention when using a thermally in situ crystallizable glass, the molded glass is cooled in the mold until its viscosity increases sufficiently to be self-supporting at its periphery, then it is removed from the mold, cooled further as described and subjected to thermal treatment for the in situ crystallization. Obviously within the scope of the invention, all or part of the mold may be removed at any later time and, likewise, only part of the mold may be removed instead of all of it when the viscosity of the glass, upon cooling, has increased to the extent that the glass is self-supporting at the periphery.

While the invention has been discussed in terms of a telescope mirror blank, it will be appreciated by those in the art that the process can be utilized in forming light-weight glass or glass-ceramic articles of substantial thickness, such as building blocks for wall construction, containers for liquids and solids, etc., such articles having at least one cavity disposed therein and communicating with the atmosphere through an opening passing from the cavity through one surface of the article. The cross-sectional area of such an opening is substantially smaller than the cross-sectional area of the cavity.

Further, by the processes disclosed above, a more rapid and uniform cooling of a cast glass blank can be achieved, thus considerably reducing the annealing time for the blank.

In this specification, as in the above-mentioned pending applications, the terms beta-eucryptite crystals and beta-eucryptite-like crystals have been used in an alternative sense. Thus, while beta-eucryptite is often thought of as the species crystal having one mole of lithia, one mole of alumina and 2 moles of silica, both terms are used in this application to designate crystalline species having the beta-eucryptite structures, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene-like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica. In the claims, therefore, the terms beta-eucryptite and beta-spodumene are each used in this generic.

Various modifications of the present invention will be apparent to those skilled in the art. The foregoing description and examples are merely illustrative and the invention will be limited only by the claims that follow.

1. A method for forming a lightweight body from a vitreous composition comprising:
    maintaining a molten vitreous mass within a zone,
    introducing a first shaped cavity forming member into said molten vitreous mass so that said cavity forming member is spaced from the surfaces of said zone, a portion of said cavity forming member having a cross-sectional area of less than the remainder of said member, said first cavity forming member having a melting point of at least 100° F. below the fiber softening point of said vitreous mass, said molten vitreous mass flowing about the portion of said cavity forming member of less cross-sectional area,
    introducing a second cavity forming member into said zone in engagement with said first shaped cavity forming member and thereby introducing an amount of a molten vitreous mass into said zone about said second cavity forming member,
    increasing the viscosity of said vitreous mass in said zone until said mass is self-supporting,
    removing said second cavity forming member from the mass, and
    melting said first cavity forming member within said self-supporting mass and removing the molten member therefrom to thereby form a mass having a cavity therein, which cavity communicates with an adjoining hollow area through an opening smaller in cross-sectional area than the cavity.

2. A method for forming a lightweight body from a vitreous composition comprising:
    maintaining a molten vitreous mass within a zone,
    simultaneously introducing a first and second shaped cavity forming member into said molten vitreous mass, said first shaped cavity forming member being spaced from the surfaces of said zone, said first cavity forming member having a melting point of at least 100° F. below the fiber softening point of said vitreous mass,
    a portion of said first cavity forming member having cross-sectional area of less than the remainder of said member and having a plurality of openings therein,
    said second shaped cavity forming member being in removable engagement with the upper surface of said portion of said first member which is of less cross-sectional area, said second member having a passageway defined therethrough and extending to one surface thereof, said openings in said portion of said first member communicating with said zone and with said passageway, applying a vacuum to the interior of said passageway to reduce the pressure within said zone and cause the molten vitreous mass to flow about the portion of said first cavity forming member of less cross-sectional area, increasing the viscosity of said vitreous mass until said mass is self-supporting, removing said first cavity forming member from the self-supporting mass, melting said first cavity forming member within said self-supporting mass and removing the molten member therefrom, to thereby form a mass having a cavity therein, which cavity communicates with an adjoining hollow area through an opening smaller in cross-sectional area than the cavity.

3. A method for forming a lightweight body from a vitreous composition comprising:

maintaining a molten vitreous mass within a zone, introducing a first shaped cavity forming member into said molten vitreous mass so that said cavity forming member is spaced from the surfaces of said zone, a portion of said cavity forming member having a cross-sectional area of less than the remainder of said member and having a plurality of openings therein, which openings communicate with said zone and the interior of a hollow plunger releasably secured to said member and connected to a vacuum source, said first cavity forming member having a melting point of at least 100° F. below the fiber softening point of said vitreous mass, applying a vacuum to the interior of said hollow plunger to reduce the pressure within said zone and cause the molten vitreous mass to flow about the portion of said cavity forming member of less cross-sectional area, introducing a second cavity forming member into said molten mass, said second cavity forming member being mounted about said plunger, increasing the viscosity of said vitreous mass until said mass is self-supporting, removing said second cavity forming member from the mass, removing said plunger from said first cavity forming member, melting said first cavity forming member within said self-supporting mass and removing the molten member therefrom, to thereby form a mass having a cavity therein, which cavity communicates with an adjoining hollow area through an opening smaller in cross-sectional area than the cavity.

4. A method of forming a hollow glass article having at least one opening within one of its surfaces and having at least one internal cavity which communicates with the atomsphere through said opening, the cross-sectional area of said opening being less than that of said cavity comprising:

filling an open top mold having a cavity generally defining the external configuration of the glass article with a pool of molten glass, inserting into said pool a normally rigid core having an external configuration corresponding to the desired internal cavity of the hollow glass article and supporting said core within said molten glass by means extending to the surface of said molten glass and being of a smaller cross-sectional area than the cross-sectional area of the cavity within said article, applying a fluid pressure differential to a portion of surface of the pool of glass to urge the molten glass to flow upwardly relative to the core to surround the core and said supporting means within said molten glass, and allowing the glass to cool and solidify to form the glass article.

5. A method of forming a hollow glass article having at least one opening within its surfaces and having at least one internal cavity which communicates with the atmosphere through said opening, the cross-sectional area of said opening being less than that of said cavity comprising:

filling an open top mold having a cavity generally defining the external configuration of the glass article with a pool of molten glass.

immersing into said pool a normally rigid core having an external configuration corresponding to the desired internal cavity of the hollow glass article, the bulk of the core being formed of a material that is molten at the fiber softening point temperature of the glass and has sufficient heat absorbing capacity to solidify the adjacent surface of the molten glass contacting same, applying a fluid pressure differential to a portion of the surface of the pool of glass whereby the molten glass is caused to flow upwardly relative to the core to contact and surround the core, and allowing the core to melt after solidification of the glass to form said hollow glass article, and removing the molten core material from said hollow glass article.

6. A method as set forth in claim 5 wherein the core is molten at the annealing temperature of the glass.

7. A method of forming a hollow glass ceramic article having at least one opening within one of its surfaces and having at least one internal cavity which communicates with the atmosphere through said opening, the cross-sectional area of said opening being less than that of said cavity, comprising:

filling an open-top mold having a cavity generally defining the external configuration of the glass article with a pool of molten thermally crystallizable glass, disposing in said pool a normally rigid shaped core having an external configuration corresponding to the desired internal cavity of the hollow glass ceramic article, the bulk of said core being formed of a material that is molten at the fiber softening point temperature of the molten glass, said core being initially at a temperature lower than its melting point, supporting said core in said molten glass by means extending from said core to an outer surface of the mold and having a cross-sectional area less than the cross-sectional area of the cavity, whereby the molten glass flows around, under and over the core to immerse said core in the molten glass and surrounding the supporting means disposed in the molten glass, thereby forming an opening in a surface of the molten glass that is of smaller cross-sectional area than the cross sectional area of the core, the core cooling the molten glass in contact therewith thereby increasing the viscosity of the molten glass until the mass is self supporting.

melting the core and removing the molten core from the self supporting glass article, thereby forming an internal cavity in the glass corresponding to the outer configuration of the core, subjecting the glass article to a temperature within the nucleation temperature range of the said glass for a sufficient period of time to form a multiplicity of nuclei, thereafter heat treating the said glass article at a temperature within the crystallization temperature range of said glass to thermally in situ crystallize said glass article to form a crystallized glass ceramic hollow article.

8. The method as claimed in claim 7 wherein said core has a body portion and a neck portion, said neck portion having a cross-sectional area which is substantially less than that of said body portion, said neck portion extending to an outer surface of said zone.

9. A method of making a lightweight, low-expansion glass-ceramic telescope mirror blank comprising:

maintaining a molten thermally crystallizable glass within a zone, maintaining at least one shaped core within said zone and spaced from the upper and lower surfaces of said zone, a portion of said core extending to one of said surfaces of said zone and having a cross-sectional area of less than the remainder of said core within said zone, said core having a melting point below the fiber-softening point of said glass, increasing the viscosity of said glass until said glass is self-supporting, melting said core and removing said molten core from said glass, said glass having a cavity therein corresponding to the outer configuration of said core, said glass having at least one opening within one of its surfaces and said opening communicating with said cavity, the cross-sectional area of said opening being less than that of said cavity, and subjecting said glass to heat for a period of time sufficient to thermally in situ crystallize said glass to form a glass-ceramic telescope mirror blank.

10. The method as defined in claim 9 wherein said core is of a material which melts at a temperature from about 800° F. below the annealing point of the vitreous mass to a temperature of about 100° F. below the fiber-softening point of said vitreous mass.

11. A method of making a lightweight, low-expansion telescope mirror blank comprising:

bringing together, in a mold, molten glass and cavity-forming members arranged in a predetermined manner, each member extending from one end for a minor part of its length with a relatively small cross-section and followed by a relatively large cross-section for at least most of the balance of its length, said ends facing generally in the same direction, said cavity-forming members being of a material having a melting point below the fiber-softening point of said glass, said molten glass encompassing all the cavity-forming members for said balance of their lengths and at least that part of their length of relatively small cross-section adjacent to said balance, and said glass being thermally in situ crystallizable by maintaining at one elevated temperature for a first period of time, raising to a higher temperature, and maintaining at said higher temperature for a second period of time, cooling the molten glass in the mold until its viscosity increases sufficiently to be at least self-supporting at its periphery, cooling the glass mass only to a temperature substantially that of said elevated temperature, maintaining the glass mass at said elevated temperature for the first period of time, raising to and maintaining the molded mass at said higher temperature for said second period of time to form by said thermal treatment glass-ceramic material having a low expansion lineal thermal coefficient, and cooling the molded mass of glassceramic in a predetermined manner to produce the lightweight mirror blank, said cavity-forming members melting and being removed from said self-supporting glass during the treatment process to form corresponding cavities therein.

References Cited

UNITED STATES PATENTS

| | | | |
|---|---|---|---|
| 301,329 | 7/1884 | Beck | 65—23 |
| 807,459 | 2/1905 | Harloe | 65—23 |
| 1,087,974 | 2/1914 | Owen. | |
| 1,343,191 | 6/1920 | Allcutt. | |
| 2,045,716 | 6/1936 | McCauley | 65—93 XR |
| 2,508,891 | 5/1950 | Rowe | 65—356 XR |
| 2,669,806 | 2/1954 | Van De Walle et al. | 65—356 XR |
| 2,434,780 | 1/1948 | Wiss et al. | |
| 2,924,851 | 2/1960 | Birckhead et al. | |
| 3,113,877 | 12/1963 | Janakirama-Rao. | |
| 3,157,522 | 11/1964 | Stookey | 65—33 XR |
| 3,171,731 | 3/1965 | Barger et al. | 65—356 XR |
| 3,241,985 | 3/1966 | Kuwayama | 65—33 XR |
| 3,246,972 | 4/1966 | Smith | 65—33 XR |
| 3,277,535 | 10/1966 | Rupert. | |
| 3,286,310 | 11/1966 | Dore et al. | |
| 3,356,128 | 12/1967 | Ahrens. | |

FRANK W. MIGA, Primary Examiner

U.S. Cl. X.R.

65—33, 68, 169, 374, 93; 264—317; 249—61